Patented June 8, 1926.

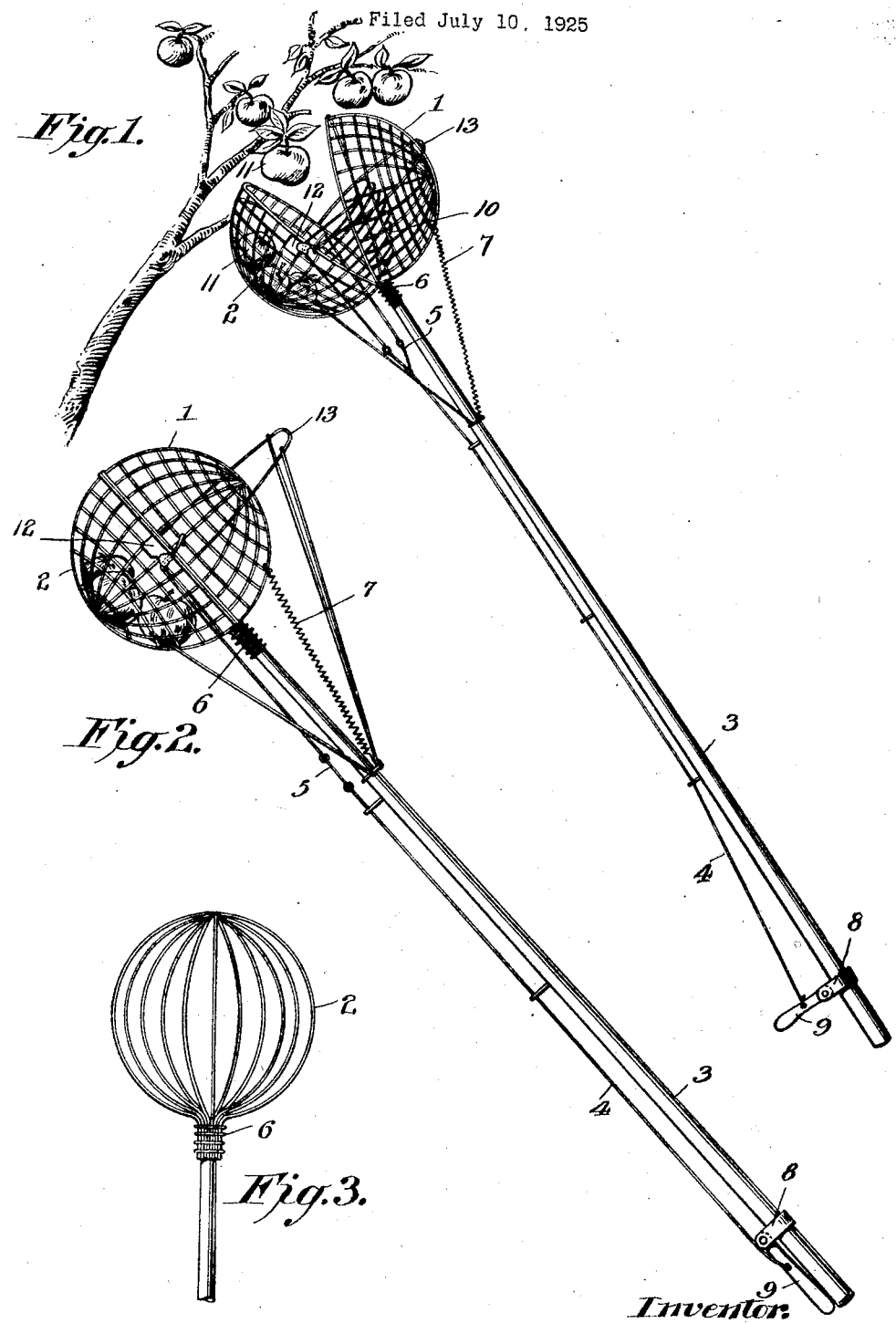

1,587,832

UNITED STATES PATENT OFFICE.

ROBERT HENRY, OF GRAND RAPIDS, MICHIGAN.

FRUIT PICKER.

Application filed July 10, 1925. Serial No. 42,679.

My invention relates to improvements in implements for picking fruit, as apples, peaches, cherries and like fruit, from trees without the necessity of shaking the fruit from the trees upon the ground and thus perhaps marring it to such an extent as to ruin it for shipment or for storage, or of climbing upon a ladder, or into the branches of a tree to pick the fruit.

I accomplish these objects by the construction of parts shown in the accompanying drawing, in which Fig. 1 is a perspective view of the implement as it appears in the process of picking the fruit. Fig. 2 is a modification in which the rigid side of the basket is set at a different angle from that shown in Fig. 1. Fig. 3 is an elevation of the side of the picker that is made fast to the handle or pole upon which it is mounted.

Similar reference characters indicate similar parts throughout the several views.

In the construction of this implement I make a basket of two parts of woven wire, as shown at 1 and 2 in Figs. 1 and 2, the part 2 being rigidly secured to the end of the handle or pole 3, and the part 1 being pivotally connected with, or hinged to the part 2, so it may be opened into the position shown in Fig. 1, for picking the fruit, or it may be closed, as in Fig. 2, for removing the fruit from the tree after it has been picked. This action of these parts is brought about as follows: A lever support 8 is secured to the lower end of the pole 3, and a lever 9 is pivotally mounted, at one end, thereon, and this lever is connected with the hinged side of the picking basket by means of a wire or rod 4 connected at one end with said lever, and at the other end with an actuating yoke 5 that passes around the sides of the rigid part, 2, of the basket, and is so connected with the hinged part, 1, of said basket, that when said lever is thrown into the position shown in Fig. 1 the spring 7 will draw the side of the basket into the position shown in Fig. 1, so that fruit, indicated at 11, may be passed between the sides of the basket and the lever, then thrown into the position indicated in Fig. 2, and the basket will be closed, as therein shown, and the fruit removed by drawing upon the pole, which operation may be repeated until the basket is filled to its capacity, when it must be removed and the fruit discharged therefrom, by properly opening the basket.

At 10 I have shown a net work of wires secured at one end to the sides of the rigid side of the basket, and adapted to slide through the openings in the edges of the hinged side of the basket and form a guide at each side of the of the basket, when open, that will prevent small fruit, as cherries, from dropping out of the basket as it is being manipulated for picking the fruit, it being understood that with the picking of each individual piece or each cluster of fruit, the basket must be opened and closed, and that when picking a number of individual pieces, or of clusters of fruit the fruit is liable to fall out of the basket when it is opened, unless some protecting element is introduced at the points indicated.

To insure the free and easy operation of the yoke 5 I securely mount a pair of curved and very smooth bearing plates 12, one to each side of the rigid part of the basket, in position so the wires or strands of which said yoke is made will pass freely and easily through the loops shown in said plates and may be operated indefinitely without danger of wearing out, or breaking the strands.

At 13 I have shown a supporting loop the ends of which are securely interwoven with the wire that forms the rigid side of the basket, with the loop passing around the hinged side of the basket in such a position that when the hinged side of the basket is opened or swung from the rigid side the spring 7 cannot draw the side of the basket beyond the said loop, thus averting the danger of the basket being opened to an inconvenient extent, and at the same time taking all strain off of the actuating yoke or wires 5.

Having thus fully described my invention, what I claim as new in the art, is:

1. In a fruit picking implement, a supporting pole, a woven wire basket made in two parts each semiglobular in form, one part rigidly connected with one end of the pole and the other part pivotally connected with the rigid part, means for operating the pivoted part toward and from the rigid part; in combination with a loop securely connected with the rigid part of the basket and positioned to surround the pivoted part when it is swing away from the rigid part.

2. In combination with the elements covered in claim 1, protecting guards connected at each side of the opening of the basket in position to prevent fruit from dropping out of the basket when picking the same.

3. In combination with the elements covered in claim 1, protecting guards at the sides of the opening in the basket, and curved loops connected with the rigid side of the basket for the free passage of the curved wire yoke that actuates the hinged half of the basket.

Signed at Grand Rapids, Michigan, July 3, 1925.

ROBERT HENRY.